United States Patent
Arcidiacono et al.

(10) Patent No.: US 9,031,501 B2
(45) Date of Patent: May 12, 2015

(54) METHOD OF INTERFERENCE REDUCTION BY GEO-LOCALISATION OF TERMINALS IN A SATELLITE TELECOMMUNICATION NETWORK

(75) Inventors: Antonio Arcidiacono, Paris (FR); Daniele Vito Finocchiaro, Paris (FR)

(73) Assignee: Eutelsat S A, Paris (FR)

( * ) Notice: Subject to any disclaimer, the term of this patent is extended or adjusted under 35 U.S.C. 154(b) by 245 days.

(21) Appl. No.: 13/574,331

(22) PCT Filed: Jan. 21, 2011

(86) PCT No.: PCT/EP2011/050852
§ 371 (c)(1),
(2), (4) Date: Jul. 20, 2012

(87) PCT Pub. No.: WO2011/089233
PCT Pub. Date: Jul. 28, 2011

(65) Prior Publication Data
US 2012/0295538 A1    Nov. 22, 2012

(30) Foreign Application Priority Data

Jan. 25, 2010   (FR) ..................... 10 50460

(51) Int. Cl.
*H04B 5/00* (2006.01)
*H04B 1/00* (2006.01)
(Continued)

(52) U.S. Cl.
CPC ........ *H04B 7/18513* (2013.01); *H04B 7/18536* (2013.01); *H04B 7/18582* (2013.01); *H04B 7/185* (2013.01)

(58) Field of Classification Search
None
See application file for complete search history.

(56) References Cited

U.S. PATENT DOCUMENTS

| 4,320,535 | A | * | 3/1982 | Brady et al. | ............... 455/278.1 |
| 5,596,439 | A | * | 1/1997 | Dankberg et al. | ............... 398/35 |

(Continued)

FOREIGN PATENT DOCUMENTS

| EP | 1 006 678 A1 | 6/2000 |
| EP | 1035664 | * 9/2000 |

(Continued)

OTHER PUBLICATIONS

International Search Report as issued for PCT/EP2011/050852 May 2, 2011.

*Primary Examiner* — Ping Hsieh
*Assistant Examiner* — James Yang
(74) *Attorney, Agent, or Firm* — Pillsbury Winthrop Shaw Pittman LLP

(57) ABSTRACT

A process for eliminating interference in a telecommunications network including a multi-beam satellite, a coverage area made up of a plurality of cells in which terminals are located, at least two of the cells, referred to as the first and second cell, being associated with the same frequency band, a first earth station including a first demodulator capable of demodulating signals transmitted by terminals located in the first cell and a second earth station including a second demodulator different from the first demodulator capable of demodulating signals transmitted by terminals located in the second cell. The process uses information supplied by the terminal, particularly its position and transmission parameters, and enables the appropriate G/T figure to be deduced. This information is then transmitted to the demodulator of the second earth station and will be used to reconstruct the signal incorporating the message and remove it from the received signal.

12 Claims, 2 Drawing Sheets

(51) Int. Cl.
  *H04B 17/00* (2006.01)
  *H04B 7/185* (2006.01)

(56) References Cited

U.S. PATENT DOCUMENTS

| | | | |
|---|---|---|---|
| 7,340,213 B2 * | 3/2008 | Karabinis et al. | 455/12.1 |
| 7,526,051 B1 * | 4/2009 | Beidas et al. | 375/349 |
| 2002/0168973 A1 * | 11/2002 | Dent et al. | 455/427 |
| 2002/0197958 A1 | 12/2002 | Collins et al. | |
| 2005/0159128 A1 * | 7/2005 | Collins et al. | 455/284 |
| 2007/0135051 A1 * | 6/2007 | Zheng et al. | 455/63.1 |
| 2010/0069010 A1 * | 3/2010 | Karakayali et al. | 455/63.1 |
| 2012/0093093 A1 * | 4/2012 | Frenger et al. | 370/329 |

FOREIGN PATENT DOCUMENTS

| | | |
|---|---|---|
| EP | 1 453 211 B1 | 7/2007 |
| EP | 2 099 142 A2 | 9/2009 |
| WO | WO 2008/038980 A1 | 4/2008 |

* cited by examiner

METHOD OF INTERFERENCE REDUCTION BY GEO-LOCALISATION OF TERMINALS IN A SATELLITE TELECOMMUNICATION NETWORK

CROSS REFERENCE TO RELATED APPLICATIONS

This application is the U.S. National Stage of PCT/EP2011/050852, filed Jan. 21, 2011, which in turn claims priority to French Patent Application No. 1050460, filed Jan. 25, 2010, the entire contents of all applications are incorporated herein by reference in their entireties.

The present invention relates to a process for eliminating interference in a telecommunications network for the establishment of radio frequency links between mobile terminals and satellites. The elimination process applies more specifically to a network using one or more satellites with several beams, referred to as multi-beam satellites. This type of satellite enables several beams to be used on board the satellite to cover geographical areas or cells, rather than a single broad beam.

Such multi-beam satellites make it possible to establish several radio frequency links occupying the same frequency band on different beams.

In the case of the broadband satellite telecommunications systems, the satellite is used bidirectionally, in other words, both:

to relay data transmitted by a hub (linked to a network operating centre or NOC) to a plurality of earth terminals: this first point-to-multipoint link constitutes the forward link;

to relay data transmitted by the earth terminals to the hub: this second multipoint-to-point link constitutes the return link.

An example of this type of multi-beam telecommunications network 1 is illustrated in FIG. 1.

This network 1 comprises:
a plurality of hubs 2, such as gateways;
an NOC 5;
a plurality of earth terminals (including maritime or aerial) 6;
one (or several) multi-beam satellite(s) 3.

The hubs 2 (also referred to henceforth as earth stations) are linked to the NOC 5 (typically via the Internet). The NOC 5 is a network management system that enables the operator to monitor and control all the network components.

In the return link, signals are sent to the multi-beam satellite 3 on an uplink LM by earth terminals 6. The signals sent by the earth terminals 6 are then processed with the satellite's payload 3, which amplifies them, redirects them to a different frequency that may be higher or lower, then retransmits them from one of its satellite antennas on a downlink LD in the form of a beam hat is received by one of the earth stations 2.

The forward link from the earth stations 2 to the earth terminals 6 works in exactly the same way in the opposite communication direction.

The coverage area in which the earth terminals are located is broken down into elementary coverage areas or cells. Each cell is associated with at least one beam belonging to the multi-beam satellite.

The network 1 as represented in FIG. 1 uses what is referred to as a frequency reuse technique. This technique enables the same frequency band to be used several times within the same satellite system, in order to expand the system's total capacity without increasing the attributed bandwidth.

Frequency reuse diagrams, referred to as colour diagrams, are known in the art and use a colour to represent each of the satellite's beams. These colour diagrams are used to describe the allocation of a plurality of frequency bands to the satellite beams in preparation for radio frequency transmissions to be made in each of these beams. In these diagrams, each colour corresponds to one of these frequency bands.

These multi-beam satellites further enable polarised transmissions to be sent and received. The polarisation may be linear (in this case the two polarisation directions are horizontal and vertical, respectively) or circular (in this case the two polarisation directions are anticlockwise or clockwise, respectively).

Typically, in the case of an uplink between an earth terminal and the multi-beam satellite, the satellite serves the entire coverage area which includes a plurality of base cells. Each of the cells is individually illuminated by an antenna beam from the multi-beam antenna on the satellite. A frequency band is associated with each cell and, within each frequency band, numerous different frequency channels are available for the earth terminals operating within these cells. An earth terminal of a first cell therefore operates on a slot or channel in the frequency band associated with the aforementioned first cell. It will be noted that where a transmission encoding system based on code division multiple access (CDMA) is used, the terminals of the same cell may use one and the same channel.

The user terminal likewise works within a particular time slot for the channel used. The uplink from the user terminal is guided in the main beam of the multi-beam antenna covering the cell.

The same polarisation and the same frequency are reused for cells that are sufficiently remote from one another to allow isolation between the cells. The signals from terminals located in a first cell corresponding to particular frequency band and a particular polarisation are decoded by an earth station equipped with a dedicated demodulator, whereas the signals from terminals located in different cells from the first cell but using the same frequency band and the same polarisation are regarded as interference signals (i.e. equivalent to noise signals).

Interference cancellers are known in the art, which are able to cancel the interference produced by terminals located within the same cell. These interference cancellers are stage structures. The principle on which they operate involves regenerating the interference using the signal estimated at the current stage output. This interference is then removed from the received signal and the resulting signal constitutes the input of the following stage.

However, such interference cancellers do not solve the problem associated with interference between the different cells using the same frequency band.

The current solution involves locating cells that use the same frequency band apart spatially, so that they are isolated from one another.

This solution therefore introduces major constraints when defining the frequency plan of the coverage area.

In this context, the object of the present invention is to provide a process for eliminating interference in a telecommunications network for the establishment of radio frequency links, said process enabling the interference between different cells using the same frequency band to be effectively eliminated.

To this end, the invention proposes a process for eliminating interference in a telecommunications network for the establishment of radio frequency links, the network comprising:

a telecommunications satellite with several beams, referred to as a multi-beam satellite, a coverage area made up of a plurality of cells in which terminals are located, each cell being associated with at least one beam linking the satellite to which a frequency band is assigned, at least two of the aforementioned cells, referred to as the first and second cell, being associated with a same frequency band, a first earth station consisting of a first demodulator capable of demodulating signals transmitted by terminals located in the first cell and transmitted via the multi-beam satellite, a second earth station consisting of a second demodulator different from the first demodulator capable of demodulating signals transmitted by terminals located in the second cell and transmitted via the multi-beam satellite, said process being characterised in that it is made up of the following stages:

when a terminal located in the first cell wants to send a message, said terminal determines its position in the coverage area and the message's transmission parameters;

transmission of the message by the terminal via multi-beam satellite, said message incorporating the message's payload and also the transmission parameters and terminal position;

reception by the first earth station of a modulated signal incorporating the message transmitted by said terminal;

demodulation of the signal by the first demodulator, so as to recover the following information relating to the message:

message payload;

transmission parameters;

position of the terminal;

estimate by the first demodulator of the power at which the message is received by the first earth station, of the figure of merit associated with the terminal's position in relation to the first cell and of the point at which the message is sent by the terminal;

transmission by the first earth station to the second demodulator of information relating to the message, as well as the estimated power, the figure of merit associated with the terminal position in relation to the first cell and the point at which the message is sent by the terminal;

estimate by the second demodulator of a message representing the message sent by the terminal, as received by the second demodulator, said estimate being made from:

information relating to the message and the estimated power transmitted by the first earth station and the figure of merit associated with the position of the terminal in relation to the second cell;

an operation performed by the second demodulator, involving removing from the modulated signal incorporating the message transmitted by the terminal as received by the second earth station, the estimated representative message, so that the interference generated by the message sent by the terminal is eliminated from this modulated signal.

Terminal is taken to mean a terminal that may be fixed, transportable or mobile. This terminal may be an earth terminal but, equally, it may be a terminal on board a plane or boat.

Hub is taken to mean any main station, such as a gateway linked to the operating centre, typically via an Internet backbone.

According to the invention, the information supplied by the terminal, particularly its position and transmission parameters, such as the power with which the message is transmitted and the type of antenna (i.e. the name of the antenna enabling the detailed characteristics of the antenna to be identified, for example in a database to which the earth stations have access) and received by the first earth station is advantageously used. This information is then transmitted to the demodulator of the second earth station and will be used to reconstruct the signal incorporating the message and remove it from the received signal. The process according to the invention thereby enables the demodulator to regenerate the signal not intended for it (regeneration that would not have been possible without the transmission of information relating to the terminal) and to suppress the interference generated by this signal at the second demodulator. Thanks to the process according to the invention, it is therefore possible to devise a frequency plan with adjacent cells using the same frequency band, thereby avoiding the need for the spatial isolation particular to known frequency reuse systems.

It will be noted that the first earth station may likewise transmit to the second demodulator other properties of the message estimated by the first earth station (phase rotation and/or frequency shift . . . ) in order to cancel the message interference on other signals received.

The process according to the invention may equally present one or more of the characteristics below, considered individually or according to all the technically possible combinations:

said first and second cells are contiguous;

the message transmission parameters include:

the power with which the message is transmitted by the terminal;

an identifier of the type of transmitting antenna on the terminal;

the gain of the terminal's transmitting antenna;

when a terminal located in the first cell wishes to send a message, said terminal determines, apart from its position in the coverage area, the speed of its transfer, the transmission parameters of the message including said speed;

when a terminal located in the first cell wishes to send a message, said terminal determines, apart from its position in the coverage area, the direction of its transfer, the transmission parameters of the message including said direction;

the stage at which said terminal determines its position in the coverage area is accomplished using one of the following methods:

a satellite positioning method, such as GPS, EGNOS or Galileo;

a positioning method using wireless access points such as WIFI or WiMax points;

a positioning method based on one or more GSM or UMTS cellular base stations;

a method based on absolute positioning means, such as measuring the geomagnetic field or the power of known radio stations;

a method based on relative positioning means, such as an inertial positioning system;

the geographical position in the coverage area is determined by the terminal with a degree of accuracy below the size beyond which the figure of merit varies by more than 1 dB/K.

Other characteristics and advantages of the invention will clearly emerge from the description of it given below, which is intended as a guide and is in no way limiting, with reference to the attached figures, among which:

The elements common to each of the figures have the same reference numbers.

Figure 1:
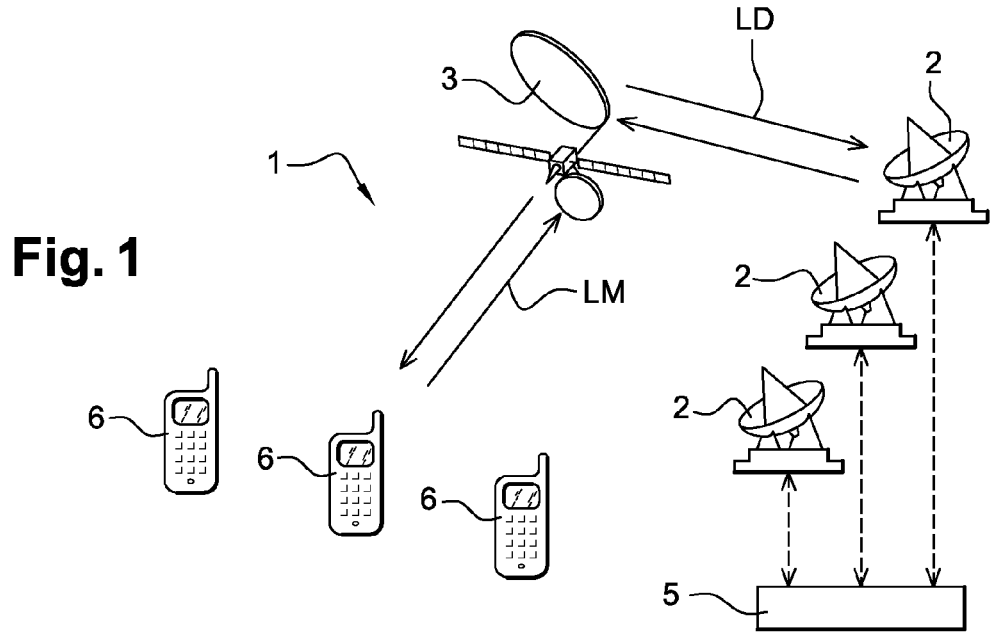
FIG. 1 is a simplified diagrammatic representation of a multi-beam configured network.

FIG. 1 has already been described above with reference to the reminder about the state of the art.

Figure 2:
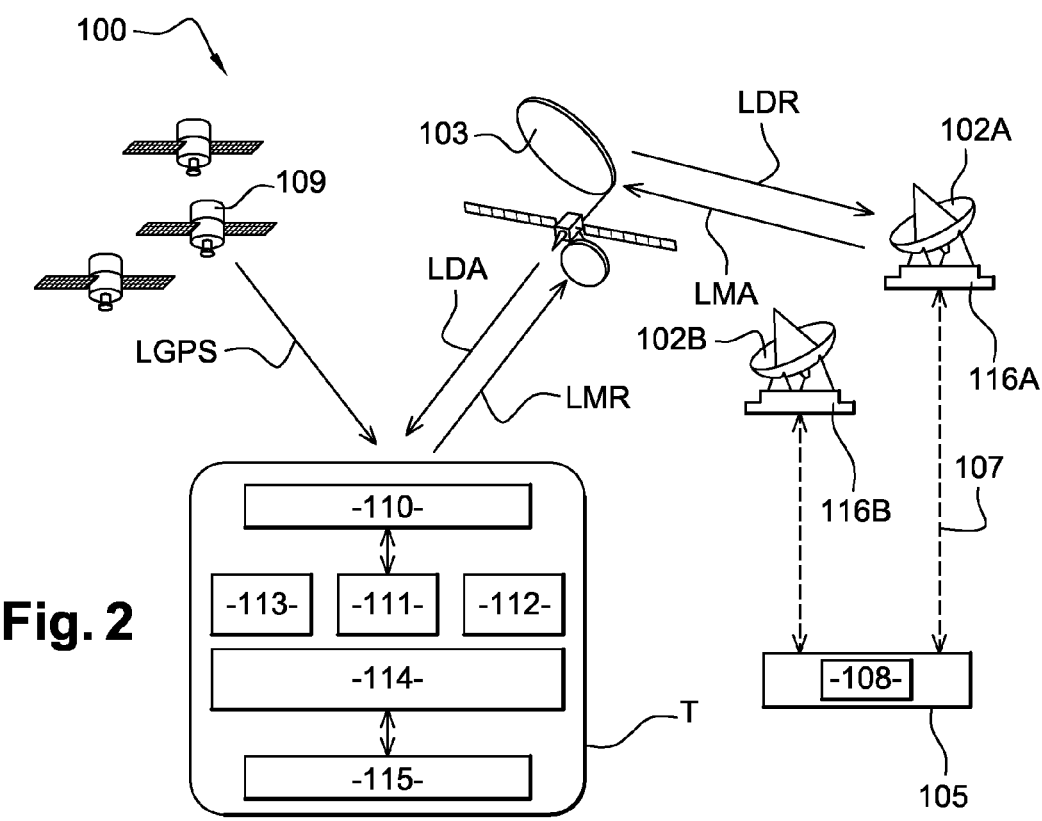
FIG. 2 is a simplified diagrammatic representation of a sample network for implementation of the process according to the invention.
Figure 3:
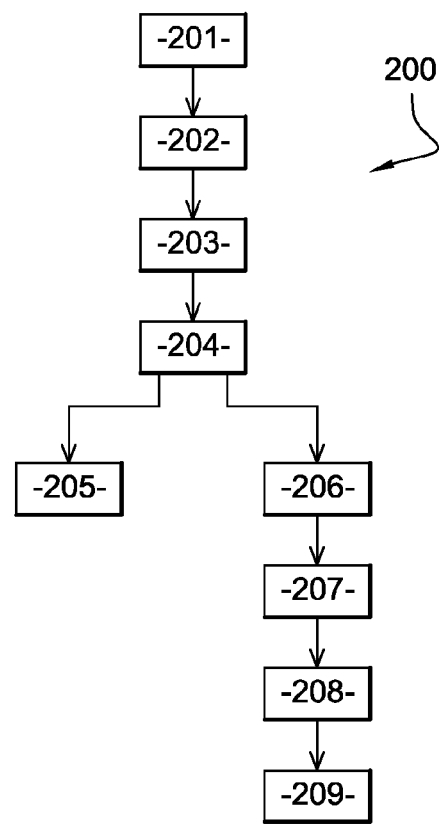
FIG. 3 illustrates the different stages in the process according to the invention.

FIG. 3 illustrates the different stages in a process 200 for eliminating interference in a telecommunications network according to the invention. This process 200 may, for example, be implemented by means of a telecommunications network such as the network 100 represented in FIG. 2.

This network 100 is made up of:
- a plurality of hubs 102A, 102B such as gateways;
- an NOC 105;
- a plurality of terminals (earth terminals, for example) T which may be mobile terminals, but also fixed terminals (by way of illustration, a single earth terminal T is represented here);
- a multi-beam satellite 103.

The satellite 103 covers a coverage area in which the earth terminals are divided into elementary coverage areas or cells. The configuration of the network 100 as represented in FIG. 2 uses a technique referred to as frequency reuse: this technique allows the same frequency band to be used several times within the same satellite system, in order to expand the system's total capacity without increasing the attributed bandwidth.

For each cell, it is possible to use at least one frequency band corresponding to a section of the available bandwidth. Each frequency band is associated with a beam from the multi-beam satellite. Each frequency band may be broken down into a plurality of frequency channels. An earth terminal T may therefore use a frequency channel to transmit; this same terminal T will likewise work within a particular time slot.

Figure 4:
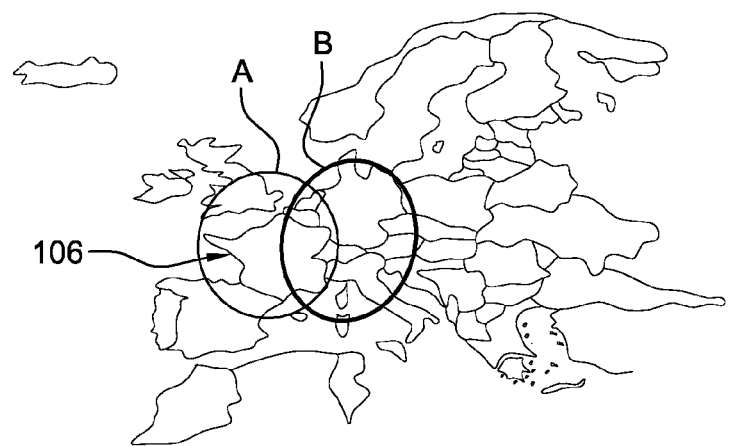
FIG. 4 illustrates an example of two contiguous cells in a coverage area.

Two hubs 102A and 102B are represented here by way of illustration; the earth station 102A includes a demodulator 116A adapted to demodulate signals emanating from a cell A, whereas the earth station 102B includes a demodulator 116B adapted to demodulate the signals emanating from a cell B. We will speculate here that the two cells A and B are associated with the same frequency band and that the earth terminal T is located in the cell A. An example of cells A and B (contiguous here) is illustrated in FIG. 4 in the case of a coverage area covering part of Europe. The terminal T is, for example, located in Brest in cell A; in this case, this terminal will be "understood" by demodulator 116A at a certain power and by demodulator 116B at a far weaker power. The process according to the invention enables the same frequency band to be used for cells A and B when the latter are contiguous (so without spatial isolation).

It will be noted, moreover, that the earth stations 102A and 102B may be located at different sites; they may likewise be located at the same site (in this case, a single earth station will consist of two different demodulators capable of demodulating signals from the two cells A and B).

The earth terminal T is equipped with:
- an antenna 110,
- a global positioning system (GPS) 113, enabling it to identify its position at any time via LGPS links with satellites 109,
- a model 111 enabling it to transmit and receive data during exchanges with the multi-beam satellite 103;
- storage means 112 (database);
- management means 114;
- input/output interface means 115 (keyboard, speaker, . . . ).

The management means 114 typically comprise a microprocessor controlled by programs located in a program memory. The program memory is particularly intended for the management of different operations to be performed in order to implement various functions of the terminal T. It includes several software means (i.e. applications), some of which are dedicated to the implementation of the invention. In other exemplary embodiments, these software means could be replaced with specific electronic circuits.

The hubs 102A and 102B (likewise referred to indiscriminately as gateways) are linked to the NOC 105, typically via an Internet backbone.

In the return link, signals are sent to the multi-beam satellite 103 on an uplink LMR by the earth terminal T. The signals sent by the earth terminals T are then processed by the satellite 103 which, via its payload, amplifies them, redirects them to an appropriate frequency then retransmits them from the satellite antenna or antennas on a downlink LDR in the form of a beam or a plurality of beams to the earth stations 102A and 102B. As indicated earlier, the demodulator 116A shall receive signals from the terminal T with more power than the demodulator 116B.

The forward link, including the uplinks LMA and downlinks LDA of the earth stations 102A, 102B to the earth terminals T, works in an identical way in the opposite communication direction.

The NOC 105 comprises means 108 of mapping the coverage area by plotting the characteristic transmission parameters of the position of the earth terminals in the coverage area. These plotting means 108 shall be designed hereafter by the term "optimisation means". The transmission parameters typically include the frequency band, the frequency channel, the time slot and the type of modulation or code to be used by the terminals, depending on their position in the coverage area. The mapping is global; in other words, it includes transmission parameters for the entire coverage area: these transmission parameters are determined by optimisation means 108 so as to reduce the cross-interference between the cells and maximise system performance.

Based on this, when the terminal T wants to establish a connection, it starts by locating its position via its GPS 113. The management means 114 of the terminal T include a software application making it possible to determine from its position and the stored maps the transmission parameters (frequency band, frequency channel within this band, time slot, modulation, polarisation, level, code, FEC . . . ) to be used to establish this connection, by choosing from among the possible parameters defined by the mapping. According to a preferred embodiment of the invention, it is important for the terminal to be able to determine its position within the coverage area with an accuracy below the size beyond which the figure of merit varies by more than 1 dB/K (typically an accuracy of within 50 km for a cell 500 km in diameter).

The optimisation means 108 typically use combinatorial algorithms, so as to determine the best possible mapping to reduce cross-interference between the cells. In other words, the optimisation means 108 are going to determine the mapping by allowing a maximum amount of data to be transferred from the earth terminals T to the earth stations via the satellite 103, while minimising the impact of the cross-interference generated by the different cells. The mapping is transmitted to all earth terminals T on the network 100 then is stored by each of the earth terminals T in their storage means 112. This technique using optimisation means 108 and the transmission of mapping to all terminals is described more particularly in patent application FR 09/50854, filed by EUTELSAT on 11 Feb. 2009.

It will be noted that the use of optimisation means 108 described above is simply given by way of illustration; it can likewise be envisaged that the terminal T will dispose of its transmission parameters by other means (for example, manual configuration by the user, pre-configuration of origin as certain parameters of the SIM cards of mobile phones, negotiation with the earth station by exchanging several messages).

The process 200 for eliminating interference according to the invention works in the following way.

According to a first stage 201, when the terminal T intends to send a message, it starts by locating its position via its positioning system 113 and determines its transmission parameters. In addition to the transmission parameters mentioned above (frequency band, frequency channel within this band, time slot, modulation, polarisation, level, code, FEC . . . ), the terminal T likewise includes in this list of transmission parameters the power with which the message is transmitted by the terminal and also the gain of the terminal's transmitting antenna. Rather than the antenna gain, the list of transmission parameters may incorporate information relating to the type of antenna used by the terminal.

It will be noted that this list of transmission parameters may likewise include, apart from the terminal's position in the coverage area, its speed and direction of movement.

It will likewise be noted that if the GPS position of the terminal T is not available, the latter may likewise use an established or estimated position by other means or a previously established position.

According to a stage 202, the terminal T will then incorporate at the same time in the message being transmitted (in the payload or the message header) the transmission parameters mentioned above and its position in the coverage area.

According to a stage 203, the message is then transmitted in the form of a signal sent to the satellite 103 on an uplink LMR. The signal sent is then processed by the satellite 103, which amplifies it, redirects it to an appropriate frequency then retransmits it from the satellite antenna across a downlink LDR in the form of a beam towards the earth stations 102A and 102B.

According to a stage 204, once the message has been transmitted from cell A, the signal will be received with sufficient power to be demodulated by the demodulator 116A of the earth station 102A.

The demodulator 116A demodulates the received signal in a known manner and recovers the packet corresponding to the message transmitted by the terminal T; it thereby recovers the following information:
 the position of the terminal T;
 the transmission parameters;
 the message's payload.

The demodulator 116A will likewise deduce from the position of the terminal T the figure of merit associated with the ground terminal's position in relation to cell A by accessing a coverage plan containing the figures of merit as a function of the geographical position; the figure of merit noted (G/T) corresponds to the ratio of the gain of the satellite reception antenna in the direction of the terminal position to the equivalent noise temperature of the receiving system. Expressed in dB/K, it impacts the capacity of the earth station 102A to receive a signal from a terminal according to its position; the figure of merit G/T associated with the earth station 102A (corresponding to cell A) will be noted hereinafter as S(T,A) for the location of terminal T; in more general terms, the figure of merit G/T associated with the earth station 102X (corresponding to cell X) will be noted hereinafter as S(Y,X) (expressed in dB/K) for the location of terminal Y. This figure of merit includes the figure of merit of the receiving satellite antenna (which depends on the terminal's geographical position), of the satellite's on-board amplifier, of the earth station's receiving antenna, of its amplifiers and cables up to the demodulator input.

The demodulator 116A will likewise determine the point in time at which the message was sent by the earth terminal T, for example from the time when the message was received by the demodulator itself. It may likewise receive this information on the sending time straight from the terminal T, i.e. contained inside the message.

The demodulator 116A may likewise use the speed and direction of travel of the terminal T to estimate the Doppler effect, in order to determine the precise frequency at which the message has been received.

The demodulator 116A may likewise deduce from the type of antenna used by the terminal T the gain of this antenna in the satellite direction (which may change depending on the elevation of the satellite 103 at the position of the terminal T); this may be deduced, for example, using a database incorporating information on gain, depending on the designation of the antenna used.

Stage 204 likewise involves an estimate of the power P(T, A) at which the message transmitted by the terminal T has been received by the earth station 102A. In more general terms, the power at which the message transmitted by the terminal Y was received by said earth station 102X (corresponding to cell X) will be noted by the sequence P(Y,X) (expressed in dBW).

In a known manner, according to stage 205, the earth station 102A may use an interference cancellation process for signals coming from cell A (intracellular interference cancellation). To do this, the earth station 102A reconstructs a "clean" signal (i.e. non-noise-affected signal) from data recovered from the message then removes this "clean" signal from the received signal. The new signal obtained is in turn processed by the demodulator 116A. This operation may be repeated for other packets. Its operating principle involves regenerating the interference using the estimated signal at the current stage output. This interference is then removed from the signal received and the resulting signal constitutes the input of the following stage. The operation may be carried out by grouping together several packets (for example, ten packets are demodulated before regenerating the signal being subtracted).

In parallel, according to a stage 206, the earth station 102A transmits to the demodulator 116B of the earth station 102B the following information:
 the position of the earth terminal T;
 the transmission parameters of the earth terminal T;
 the message payload;
 the figure of merit S(T,A) associated with the position of the earth terminal in relation to the cell A;
 the point in time at which the message was sent by the earth terminal T;
 the estimate of the power P(T,A) at which the message transmitted by the terminal T has been received by the earth station 102A.

The transmission of the above payload to the demodulator 116B may take place, for example, via an Internet transmission.

According to a stage 207, the earth station 102B will estimate the power P(T,B) at which the message transmitted by the terminal T has been received by the earth station 102B. To do this, the earth station 102B will use, in particular, information relating to the position of the terminal T, the figure of merit S(T,A) associated with the position of the earth terminal in relation to the cell A and the estimate of the power P(T,A) at which the message transmitted by the terminal T has been received by the earth station 102A. It should be noted here that the earth station 102B benefits from information transmitted via the earth station 102A and obtained thanks exclusively to the demodulator 116A; in the absence of this transmission, the signal transmitted by the terminal T would have been unusable and regarded as noise by the earth station 102B (in other words, the power P(T,B) is too weak for the message to be demodulated by the demodulator 116B of the earth station 102B).

According to a first embodiment of this stage 207, from the location of the terminal T, the earth station 102B can determine the figure of merit S(T,B) associated with the position of the earth terminal in relation to the cell B (by accessing a coverage plan database containing figures of merit, depending on the geographical position). Based on the assumption that the earth stations 102A and 102B have the same link budget, this produces:

$$P(T,B)=P(T,A)-S(T,A)+S(T,B).$$

According to a second embodiment of the stage 207, we assume that a reference terminal R located perfectly within the coverage area and different from the terminal T transmits reference messages, so that the following are known with a good degree of accuracy:

the figure of merit S(R,A) associated with the position of the earth terminal R in relation to the cell A;

the power P(R,A) at which the reference message transmitted by the terminal R is received by the earth station 102A;

the figure of merit S(R,B) associated with the position of the earth terminal R in relation to the cell B;

the power P(R,B) at which the reference message transmitted by the terminal R is received by the earth station 102B.

The ratio of the normalized powers of terminal T and of the reference terminal R is the same, independently of the cell A or B; the normalized power is expressed as the ratio between the power received and the figure of merit; when the received power and the figure of merit are expressed in dB, this ratio is expressed by the difference: P(Y,X)–S(Y,X); on this basis, this produces the relationship:

$$P(T,A)-S(T,A)-((P(R,A)-S(R,A))= P(T,B)-S(T,B)-((P(R,B)-S(R,B)).$$

The power P(T,B) is deduced from this, estimated by the relationship:

$$P(T,B)=P(T,A)-S(T,A)-P(R,A)+S(R,A)+ P(R,B)-S(R,B)-S(R,B)+S(T,B)$$

The closer the reference terminal R is to terminal T, the better the above estimate will be.

Stage 207, executed according to this second embodiment, enables an estimate to be made that remains independent of the link budget of the earth stations 102A and 102B, unlike in the case of the first embodiment.

According to a stage 208, the earth station 102B will then advantageously use the estimated power P(T,B), the message's payload and also the point at which the message is transmitted by the terminal T to reconstruct a representative signal of the signal including the message transmitted by the terminal T, as received by the earth station 102B.

According to a stage 209, this reconstructed signal is then subtracted from the signal received by the earth station 102B.

The invention is of course not limited to the embodiment just described.

Hence, even if the invention has been more specifically described for a network using a GPS, it is equally applicable to other positioning means, such as positioning means using WIFI access points or based on GSM base stations.

The invention may be applied to different types of telecommunications network using a multi-beam satellite, such as a satellite working on the frequency band S or Ka.

Finally, although the elimination process has been more specifically described within the framework of a single multi-beam satellite, it likewise applies to a network using several multi-beam satellites.

What is claimed is:

1. A process for eliminating interference in a telecommunications network for the establishment of radio frequency links, the network comprising:

a multi-beam satellite, the multi-beam satellite being associated with a coverage area made up of a plurality of cells in which terminals are located, each cell being associated with a beam linking the satellite to which a frequency band is assigned, a first and a second cell being associated with a same frequency band, a first earth station including a first demodulator configured to demodulate first cell signals transmitted by terminals located in the first cell and first earth station signals transmitted via the multi-beam satellite, a second earth station including a second demodulator different from the first demodulator configured to demodulate second cell signals transmitted by terminals located in the second cell and second earth station signals transmitted via the multi-beam satellite, said process comprising:

before a message is sent by a terminal located in the first cell, determining by said terminal a position of the terminal in the coverage area and transmission parameters of the message;

transmitting the message by the terminal via the multi-beam satellite, said message incorporating a message payload of the message and the transmission parameters and terminal position;

receiving by the first earth station a modulated signal incorporating the message transmitted by said terminal;

demodulating the signal by the first demodulator to recover the message payload, the transmission parameters and the position of the terminal;

estimating by the first demodulator a power at which the message is received by the first earth station, of a figure of merit associated with the position of the terminal in relation to the first cell and a time at which the message is sent by the terminal;

transmitting by the first earth station to the second earth station information relating to the message, and the estimated power, the figure of merit associated with the terminal position in relation to the first cell and the time at which the message is sent by the terminal;

estimating by the second demodulator an estimated message representing the message sent by the terminal, as received by the second earth station, said estimate being made from:

information relating to the message and the estimated power and the figure of merit associated with the position of the terminal in relation to the second cell; and removing by the second demodulator from the modulated signal incorporating the message transmitted by the terminal as received by the second earth station, the estimated representative message, so that an interference generated by the message sent by the terminal is eliminated from the modulated signal.

2. The process according to claim 1, wherein said first and second cells are contiguous.

3. The process according to claim 1, wherein the message transmission parameters include the power with which the message is transmitted by the terminal.

4. The process according to claim 1, wherein the message transmission parameters include an identifier of the type of transmitting antenna on the terminal.

5. The process according to claim 1, wherein the message transmission parameters include a gain of transmitting antenna on the terminal.

6. The process according to claim 1, wherein when a terminal located in the first cell wants to send a message, said terminal determines, apart from a position thereof in the coverage area, a speed of its movement, the transmission parameters of the message including said speed.

7. The process according to claim 1, wherein when a terminal located in the first cell wants to send a message, said terminal determines, apart from a position thereof in the coverage area, a direction of its movement, the transmission parameters of the message including said direction.

8. The process according to claim 1, wherein the determining includes one of: a satellite positioning method; a positioning method using wireless access points; a positioning method based on one or more GSM or UMTS cellular base stations; a method based on absolute positioning system; a method based on relative positioning means.

9. The process according to claim 1, wherein a geographical position in the coverage area is determined by the terminal with a degree of accuracy below the size beyond which the figure of merit varies by more than 1 dB/K.

10. The process according to claim 8, wherein the satellite positioning method includes GPS, EGNOS or Galileo.

11. The process according to claim 8, wherein the wireless access points include WLAN or broadband cellular access points.

12. The process according to claim 8, wherein the absolute positioning system is configured to measure a geomagnetic field or a power of known radio stations.

* * * * *